(12) United States Patent
Jang et al.

(10) Patent No.: US 12,355,574 B2
(45) Date of Patent: Jul. 8, 2025

(54) METHOD AND APPARATUS FOR APPLYING HARQ TO MULTICAST BROADCAST SERVICE IN WIRELESS COMMUNICATION SYSTEM

(71) Applicant: Samsung Electronics Co., Ltd., Suwon-si (KR)

(72) Inventors: Jaehyuk Jang, Suwon-si (KR); Soenghun Kim, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 17/914,069

(22) PCT Filed: Mar. 23, 2021

(86) PCT No.: PCT/KR2021/003550
§ 371 (c)(1),
(2) Date: Sep. 23, 2022

(87) PCT Pub. No.: WO2021/194204
PCT Pub. Date: Sep. 30, 2021

(65) Prior Publication Data
US 2023/0155741 A1 May 18, 2023

(30) Foreign Application Priority Data
Mar. 25, 2020 (KR) ........................ 10-2020-0036155

(51) Int. Cl.
*H04L 1/1822* (2023.01)
*H04L 1/1829* (2023.01)
*H04W 36/00* (2009.01)

(52) U.S. Cl.
CPC .......... *H04L 1/1822* (2013.01); *H04L 1/1864* (2013.01); *H04W 36/0007* (2018.08)

(58) Field of Classification Search
CPC .. H04L 1/822; H04L 1/1822; H04W 36/0007; H04W 1/1864
See application file for complete search history.

(56) References Cited

U.S. PATENT DOCUMENTS 10,327,188 B2  6/2019  Pani et al.
10,334,560 B2  6/2019  Kim et al.
(Continued)

FOREIGN PATENT DOCUMENTS

KR   10-2016-0140967 A   12/2016
KR        10-1935785 B1    4/2019
(Continued)

OTHER PUBLICATIONS

Yeo et al.; Outer code-based HARQ Retransmission for Multicast/Broadcast Services in 5G; 2019 IEEE 90th Vehicular Technology Conference (VTC2019—Fall); IEEE; Nov. 7, 2019.
(Continued)

*Primary Examiner* — Benjamin H Elliott, IV
*Assistant Examiner* — Tracy Lauren Colbert
(74) *Attorney, Agent, or Firm* — Jefferson IP Law, LLP

(57) ABSTRACT

According to an embodiment of the present disclosure, a method performed by a user equipment (UE) in a wireless communication system includes receiving, from a base station (BS), multicast broadcast service (MBS) configuration information including information about at least one hybrid automatic repeat request (HARQ) process for an MBS, receiving, from the BS, MBS data based on the MBS configuration information, and processing the MBS data based on an HARQ process corresponding to the MBS data among the at least one HARQ process for the MBS.

11 Claims, 8 Drawing Sheets

(56) References Cited

U.S. PATENT DOCUMENTS

| | | | |
|---|---|---|---|
| 10,375,757 B2 | 8/2019 | Kim et al. | |
| 11,405,169 B2 | 8/2022 | Kim et al. | |
| 2010/0215004 A1* | 8/2010 | Yoo | H04L 1/0031 |
| | | | 370/329 |
| 2011/0310845 A1* | 12/2011 | Jung | H04W 36/385 |
| | | | 370/331 |
| 2020/0128557 A1* | 4/2020 | Suzuki | H04W 8/04 |
| 2021/0068004 A1* | 3/2021 | Kadiri | H04L 47/15 |
| 2023/0050170 A1* | 2/2023 | Wang | H04L 1/1854 |

FOREIGN PATENT DOCUMENTS

| | | |
|---|---|---|
| KR | 10-2041189 B1 | 11/2019 |
| WO | 2017/026781 A1 | 2/2017 |

OTHER PUBLICATIONS

Huawei; New Work Item on NR support of Multicast and Broadcast Services; 3GPP TSG RAN Meeting #86 on Dec. 9-12, 2019; Sitges, Spain; RP-193248 (revision of RP-193163); Dec. 12, 2019.
International Search Report with Written Opinion and English translation dated Jun. 25, 2021; International Appln. No. PCT/KR2021/003550.

* cited by examiner

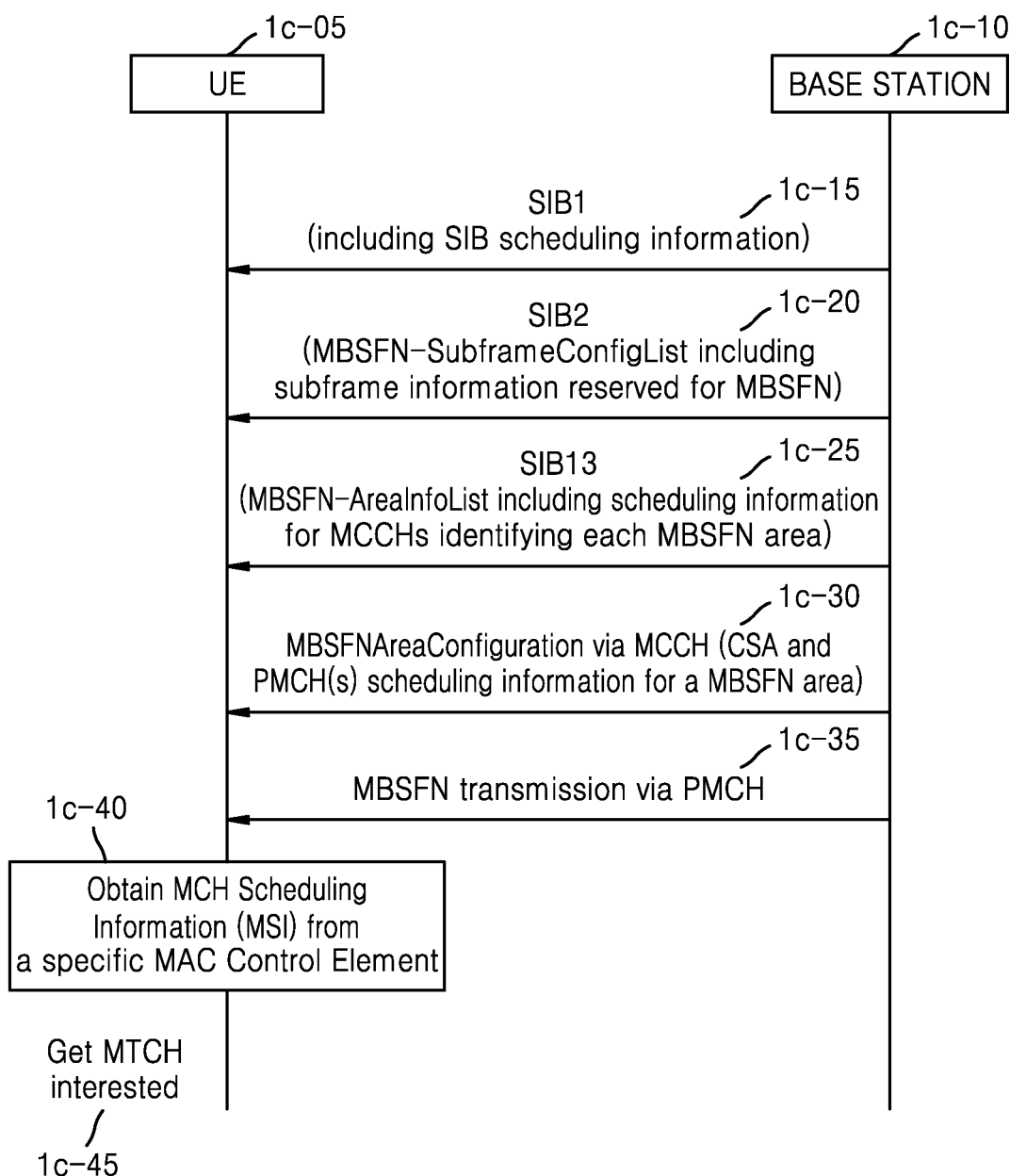

METHOD AND APPARATUS FOR APPLYING HARQ TO MULTICAST BROADCAST SERVICE IN WIRELESS COMMUNICATION SYSTEM

TECHNICAL FIELD

The present disclosure relates to a method of applying hybrid automatic repeat request (HARQ) to broadcast services in a wireless communication system.

BACKGROUND ART

Efforts have been made to develop an improved 5th generation (5G) communication system or pre-5G communication system to keep up with growing wireless data traffic demand after the commercialization of 4th generation (4G) communication systems. For this reason, the 5G or pre-5G communication system is called a beyond 4G network communication system or a post long-term evolution (LTE) system. A 5G communication system defined in the 3rd Generation Partnership Project (3GPP) is called a new radio (NR) system. Implementation of 5G communication systems in an ultra-high frequency (millimeter-wave (mm-Wave)) band (such as a 60 gigahertz (GHz) band) is under consideration to achieve high data transfer rates. To mitigate path loss of radio waves and increase transmission distance of radio waves in an ultra-high frequency band for 5G communication systems, technologies such as beamforming, massive multiple-input multiple-output (MIMO), full dimensional MIMO (FD-MIMO), array antennas, analog beamforming, and large-scale antennas are being studied and applied to NR systems. Furthermore, to improve system networks for 5G communication systems, technologies including evolved small cells, advanced small cells, cloud radio access network (Cloud-RAN), ultra-dense networks, device to device (D2D) communication, wireless backhaul, moving networks, cooperative communication, coordinated multi-points (CoMP), and received-interference cancellation are currently being developed. In addition, for 5G systems, advanced coding modulation (ACM) schemes such as Hybrid FSK and QAM Modulation (FQAM) and Sliding Window Superposition Coding (SWSC) and advanced access techniques such as Filter Bank Multicarrier (FBMC), non-orthogonal multiple access (NOMA), sparse code multiple access (SCMA), etc. are being developed.

Moreover, the Internet has evolved from a human-centered connection network, in which humans create and consume information, to the Internet of things (IoT) network in which dispersed components such as objects exchange information with one another to process the information. Internet of Everything (IoE) technology has emerged, in which the IoT technology is combined with, for example, technology for processing big data through connection with a cloud server. To implement the IoT, technologies such as a sensing technology, a wired/wireless communication and network infrastructure, a service interface technology, and a security technology are required, and thus, research has recently been conducted into technologies such as sensor networks for interconnecting objects, machine to machine (M2M) communication, and machine type communication (MTC). In an IoT environment, intelligent Internet technology services may be provided to create new values for human life by collecting and analyzing data obtained from interconnected objects. The IoT may be applied to various fields such as smart homes, smart buildings, smart cities, smart cars or connected cars, a smart grid, healthcare, smart home appliances, advanced medical services, etc., through convergence and integration between existing information technology (IT) and various industries.

Thus, various attempts are being made to apply a 5G communication system to the IoT network. For example, technologies such as sensor networks, M2M communication, MTC, etc., are implemented using 5G communication techniques such as beamforming, MIMO, array antennas, etc. The application of a cloud RAN as the above-described big data processing technology may be an example of convergence between the 5G and IoT technologies.

In particular, with advancements in a wireless communication system, a method of efficiently supporting a broadcast service (a multicast and broadcast service (MBS)) is required.

DESCRIPTION OF EMBODIMENTS

Solution to Problem

According to an embodiment of the present disclosure, a method performed by a user equipment (UE) in a wireless communication service may include receiving, from a base station (BS), multicast broadcast service (MBS) configuration information including information about at least one hybrid automatic repeat request (HARQ) process for an MBS, receiving, from the BS, MBS data based on the MBS configuration information, and processing the MBS data based on an HARQ process corresponding to the MBS data among the at least one HARQ process for the MBS.

BRIEF DESCRIPTION OF DRAWINGS

FIG. 1C is a flowchart of a process of providing a multimedia broadcast multicast service (MBMS) broadcasting service in LTE and NR systems, according to an embodiment of the present disclosure.

MODE OF DISCLOSURE

Figure 1A:
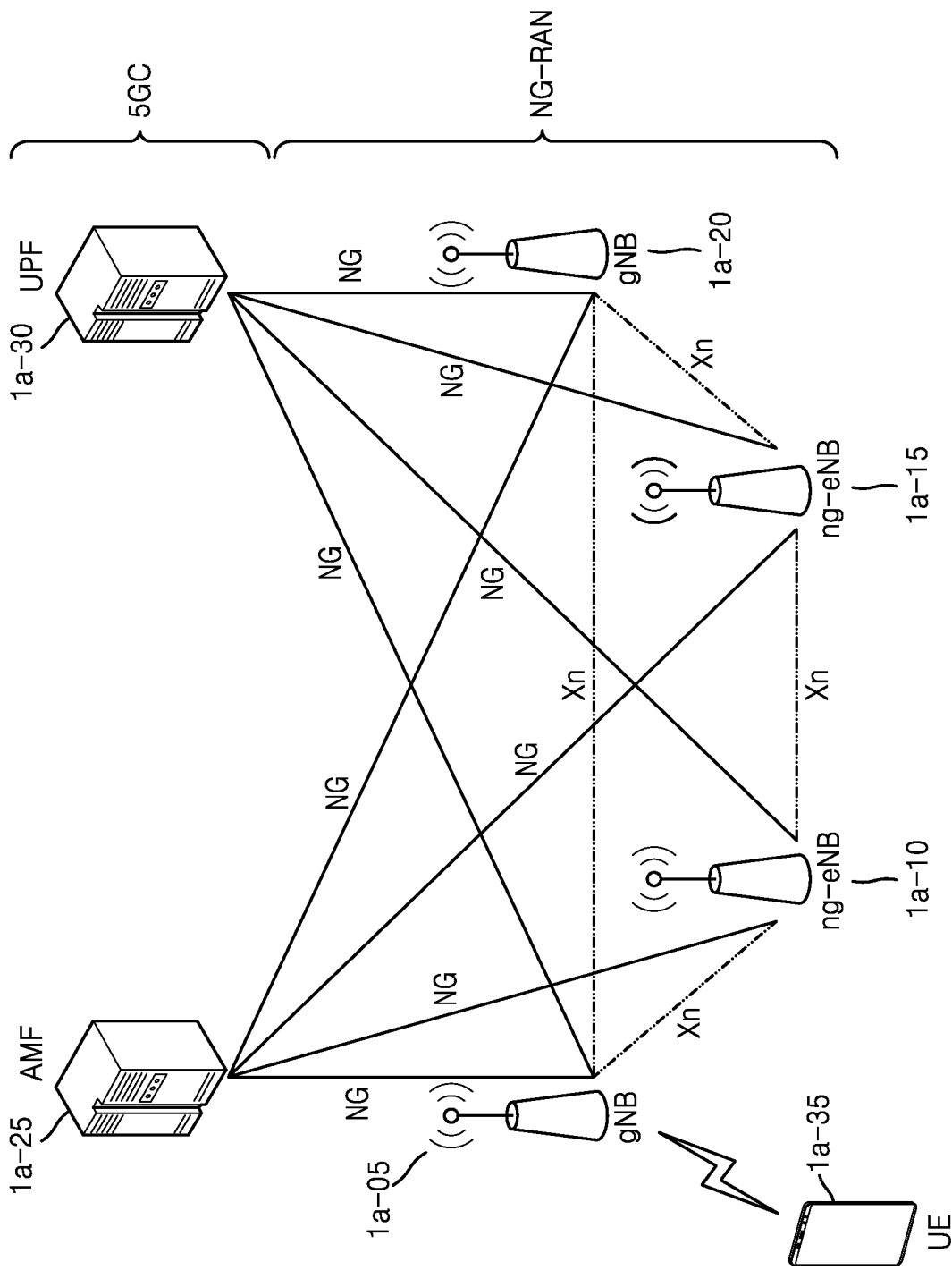
FIG. 1A is a diagram illustrating a structure of a new radio (NR) system according to an embodiment of the present disclosure.

Hereinafter, operation principles of the present disclosure will be described in detail with reference to the accompanying drawings. In the following description of the present disclosure, when it is determined that detailed descriptions of related known functions or configurations may unnecessarily obscure the subject matter of the present disclosure, the descriptions thereof will be omitted. Furthermore, the terms to be described later are defined by taking functions described in the present disclosure into account and may be changed according to a user's or operator's intent or customs. Therefore, definition of the terms should be made based on the overall descriptions in the present specification.

Advantages and features of the present disclosure and methods of accomplishing the same will be more readily appreciated by referring to the following description of embodiments and the accompanying drawings. However, the present disclosure may be embodied in many different forms and should not be construed as being limited to the disclosed embodiments set forth herein; rather, the present embodiments are provided so that the present disclosure will be thorough and complete and will fully convey the concept of the disclosure to those of ordinary skill in the art, and the present disclosure will only be defined by the appended claims. Throughout the specification, like reference numerals refer to like elements.

It will be understood that each block of a flowchart in the drawings and combinations of blocks of the flowchart may be performed by computer program instructions. These computer program instructions may be loaded into a processor of a general-purpose computer, a special-purpose computer, or other programmable data processing equipment, and thus, the instructions performed via the processor of the computer or other programmable data processing equipment create a means for performing functions specified in the flowchart block(s). The computer program instructions may also be stored in a computer-executable or computer-readable memory capable of directing a computer or other programmable data processing equipment to implement functions in a specific manner, and thus, the instructions stored in the computer-executable or computer-readable memory may produce an article of manufacture including the instruction means for performing the functions described in the flowchart block(s). The computer program instructions may also be loaded into the computer or other programmable data processing equipment, and thus, instructions for operating the computer or the other programmable data processing equipment by generating a computer-executed process when a series of operations are performed in the computer or the other programmable data processing equipment may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two blocks illustrated in succession may be executed substantially simultaneously, or the blocks may sometimes be executed in reverse order depending on functions corresponding thereto.

As used herein, the term 'unit' denotes a software element or a hardware element such as a field-programmable gate array (FPGA) or an application-specific integrated circuit (ASIC), and performs certain functions. However, the term 'unit' is not limited to software or hardware. The 'unit' may be configured so as to be in an addressable storage medium, or may be configured so as to operate one or more processors. Thus, for example, the term 'unit' may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, and variables. Functions provided by the elements and 'units' may be combined into the smaller number of elements and 'units', or may be divided into additional elements and 'units'. Furthermore, the elements and 'units' may be embodied to reproduce one or more central processing units (CPUs) in a device or security multimedia card. In addition, in an embodiment, the 'unit' may include one or more processors.

In the following descriptions of the disclosure, related known functions or configurations are not described in detail when it is deemed that they would unnecessarily obscure the essence of the present disclosure. Hereinafter, embodiments of the present disclosure will be described in detail with reference to the accompanying drawings.

As used in the following description, terms identifying access nodes, terms indicating network entities, terms indicating messages, terms indicating interfaces between network entities, terms indicating various types of identification information, etc. are exemplified for convenience of descriptions. Accordingly, the present disclosure is not limited to terms to be described later, and other terms representing objects having the equivalent technical meaning may be used. For example, in the following descriptions, a user equipment (UE) may refer to medium access control (MAC) entities in the UE, which respectively exist for a master cell group (MCG) and a secondary cell group (SCG) as described below.

Hereinafter, for convenience of descriptions, the present disclosure uses terms and names defined in the 3rd Generation Partnership Project Long-Term Evolution (3GPP LTE) standard. However, the present disclosure is not limited to the terms and names but may also be identically applied to systems that comply with other standards.

Hereinafter, a base station (BS) is an entity that allocates resources to a UE, and may be at least one of a next-generation Node B (gNB), an evolved Node B (eNB), a Node B, a BS, a wireless access unit, a BS controller, or a network node. A UE may include a mobile station (MS), a cellular phone, a smart phone, a computer, or a multimedia system capable of performing a communication function. However, the UE is not limited to the above examples.

In particular, the present disclosure may be applied to the 3GPP New Radio (NR) standard (the 5th generation (5G) mobile communications standard). Furthermore, the present disclosure may be applied to intelligent services (e.g., smart homes, smart buildings, smart cities, smart cars or connected cars, healthcare, digital education, retail businesses, security and safety related services, etc.) based on a 5G communication technology and an Internet of Things (IoT) related technology. In the present disclosure, an eNB may be used interchangeably with a gNB for convenience of descriptions. In other words, a BS described as an eNB may represent a gNB. Furthermore, the term 'UE' may refer to a mobile phone, narrowband IoT (NB-IoT) devices, sensors, and other wireless communication devices.

Wireless communication systems have progressed beyond providing initial voice-centered services into broadband wireless communication systems that provide high-speed, high-quality packet data services based on communication standards such as 3GPP's High Speed Packet Access (HSPA), LTE or Evolved Universal Terrestrial Radio Access (E-UTRA), and LTE-Advanced (LTE-A), LTE-Pro, 3GPP2's High Rate Packet Data (HRPD), Ultra Mobile Broadband (UMB), and the Institute of Electrical and Electronic Engineers (IEEE) 802.16e.

As a representative example of a broadband wireless communication system, an LTE system adopts an orthogonal frequency division multiplexing (OFDM) scheme for downlink (DL) and a single carrier frequency division multiple access (SC-FDMA) scheme for uplink (UL). UL refers to a radio link through which a UE transmits data or a control signal to a BS, and DL refers to a radio link through which the BS transmits data or a control signal to the UE. In the multiple access schemes as described above, data or control information of each user may be identified by allocating and operating time-frequency resources carrying the data or the control information for each user to prevent overlapping i.e., obtain orthogonality between the time-frequency resources.

Because a post-LTE communication system, i.e., a 5G communication system, needs to be able to freely reflect various requirements from users and service providers, the 5G communication system is required to support services that simultaneously satisfy the various requirements. Services being considered for 5G communication systems include Enhanced Mobile BroadBand (eMBB), Massive Machine Type Communication (mMTC), Ultra-Reliable Low-Latency Communication (URLLC), etc.

According to some embodiments, eMBB may aim to provide higher data transfer rates than those supported by the existing LTE, LTE-A, or LTE-Pro. For example, in 5G communication systems, eMBB should be able to deliver peak data rates of 20 gigabits per second (Gbps) in DL and 10 Gbps in UL from a BS perspective. Furthermore, the 5G communication systems should be able to provide better user perceived data rates while simultaneously delivering the peak data rates. To meet such requirements, the 5G communication systems may require improvement of various transmission and reception technologies including a further improved multi-input multi-output (MIMO) transmission technology. Furthermore, while a current LTE system transmits signals by using a maximum transmission bandwidth of 20 megahertz (MHz) in the 2 GHz band, a 5G communication system may satisfy data transfer rates required by a 5G technology by using a wider frequency bandwidth than 20 MHz in the 3 GHz to 6 GHz bands or the bands above 6 GHz.

At the same time, mMTC is being considered to support application services such as the IoT in 5G communication systems. In order to efficiently provide the IoT, the mMTC may require support of massive connections with UEs in a cell, enhanced terminal coverage, improved battery life, low terminal cost, etc. Because the IoT is a system equipped with multiple sensors and various devices to provide communication functions, it must be able to support a large number of UEs (e.g., 1,000,000 UEs per square kilometer ($km^2$)) in a cell. Furthermore, because a UE supporting the mMTC is highly likely to be located in a shaded area that cannot be covered by a cell, such as a basement of a building, due to characteristics of the service, the mMTC may require wide area coverage compared to other services provided by a 5G communication system. The UE supporting the mMTC should be configured as a low-cost UE and require a very long battery lifetime such as 10 to 15 years because it is difficult to frequently replace a battery of the UE.

Lastly, URLLC is a cellular-based wireless communication service used for mission-critical applications such as remote control of robots or machinery, industrial automation, unmanned aerial vehicles (UAVs), remote health care, emergency alert services, etc. Therefore, URLLC communications should be able to provide very low latency (ultra-low latency) and very high reliability (ultra-high reliability). For example, services supporting URLLC may have to satisfy air interface latency of less than 0.5 milliseconds (ms) and simultaneously have requirements of packet error rate of equal to or less than $10^{-5}$. Thus, for the services supporting URLLC, a 5G system has to provide a transmit time interval (TTI) shorter than for other services and may simultaneously require a design for allocating wide frequency-band resources to ensure high reliability of a communication link.

The above-described three services considered in the 5G communication systems, i.e., eMBB, URLLC, and mMTC, may be multiplexed in one system for transmission. In this regard, different transmission and reception techniques and transmission and reception parameters may be used between services to satisfy different requirements for the respective services. However, the mMTC, URLLC, and eMBB are merely examples of different service types, and service types to which the present disclosure is applied are not limited to the above-described examples.

Hereinafter, for convenience of descriptions, the present disclosure uses terms and names defined in LTE and NR standards which are latest standards defined by the 3GPP organization among existing communication standards. However, the present disclosure is not limited by the terms and names but may also be equally applied to systems that comply with other standards. In particular, the present disclosure may be applied to the 3GPP NR standard (or the 5G mobile communications standard). Furthermore, embodiments of the present disclosure may be applied to other communication systems having similar technical backgrounds and channel configurations. It should be also understood by those skilled in the art that embodiments of the present disclosure are applicable to other communication systems through modifications not departing from the scope of the present disclosure.

FIG. 1A is a diagram illustrating an architecture of an NR system according to an embodiment of the present disclosure. Referring to FIG. 1A, a wireless communication system may include a plurality of BSs 1 *a*-05, 1*a*-10, 1*a*-15, and 1*a*-20, an access and mobility management function (AMF) 1*a*-20, and a user plane function (UPF) 1*a*-30. A UE 1*a*-35 may connect to an external network through the BSs 1*a*-05, 1*a*-10, 1*a*-15, and 1*a*-20, and the UPF 1*a*-30. However, the wireless communication system is not limited to the example of FIG. 1A, and may include more or fewer components than those illustrated in FIG. 1A.

The BSs 1*a*-05, 1*a*-10, 1*a*-15, and 1*a*-20, which are access nodes in a cellular network, may provide wireless connectivity to UEs accessing the network. In other words, in order to serve users' traffic, the BSs 1*a*-05, 1*a*-10, 1*a*-15, and 1*a*-20 may schedule UEs by collecting status information such as the UE's buffer states, available transmission power states, and channel states and thus support connectivity between each UE and a core network (CN; in particular, an NR CN is referred to as a 5GC). Moreover, a communication system including an NR system may be configured to handle traffic by splitting it into a user plane (UP) related to actual user data transmission and a control plane (CP) such as connection management, etc., and the gNBs 1*a*-05 and 1*a*-20 in FIG. 1A may use UP and CP related techniques defined in an NR technology, while the ng-eNBs 1*a*-10 and 1*a*-15 may be connected to a 5GC but use UP and CP related techniques defined in an LTE technology.

The AMF (or session management function (SMF)) 1*a*-25 may be connected to a plurality of BSs as an entity responsible for various control functions including a mobility management function for a UE, and the UPF 1*a*-30 is a kind of gateway device that provides data transmission.

Figure 1B:
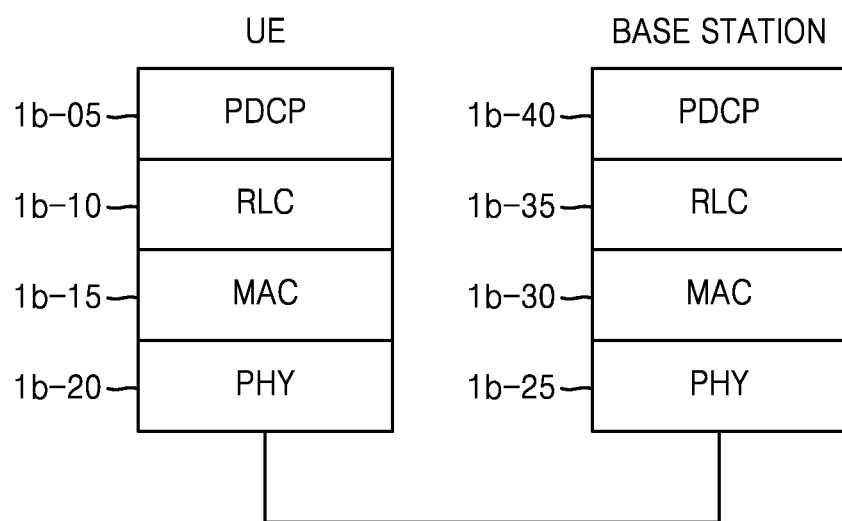
FIG. 1B is a diagram illustrating radio protocol architectures for long-term evolution (LTE) and NR systems according to an embodiment of the present disclosure.

FIG. 1B is a diagram illustrating radio protocol architectures for LTE and NR systems according to an embodiment of the present disclosure.

Referring to FIG. 1B, a radio protocol stack for each of a UE and a BS in LTE and NR systems may include a packet data convergence protocol (PDCP) layer (or entity) 1b-05 or 1b-40, a radio link control (RLC) layer (or entity) 1b-10 or 1b-35, and a medium access control (MAC) layer (entity) 1b-15 or 1b-30.

The PDCP layer 1b-05 or 1b-40 may be responsible for performing compression/decompression of an IP header, and the RLC layer 1b-10 or 1b-35 may reconfigure PDCP packet data units (PDUs) into RLC PDUs having an appropriate size.

The MAC layer 1b-15 or 1b-30 may be connected with multiple RLC layer entities configured for a UE and multiplex RLC PDUs into MAC PDUs and demultiplex RLC PDUs from MAC PDUs.

A physical (PHY) layer 1b-20 or 1b-25 may perform channel coding and modulation on upper-layer data to generate orthogonal frequency division multiplexing (OFDM) symbols and transmit the OFDM symbols via a radio channel, or perform demodulation and channel decoding on OFDM symbols received via a radio channel and transfer the demodulated and channel-decoded OFDM symbols to an upper layer. Furthermore, hybrid automatic repeat request (HARQ) may be used for additional error correction at the PHY layer, and a receiving end may transmit 1 bit of information indicating whether packets transmitted from a transmitting end are received. The information is referred to as HARQ acknowledgement (ACK)/negative acknowledgement (NACK) information.

DL HARQ ACK/NACK information for UL data transmission may be transmitted via a physical HARQ indicator channel (PHICH) in LTE, and in NR, it may be provided based on scheduling information of a corresponding UE in a physical DL control channel (PDCCH) which is a channel on which DL/UL resource assignments or the like is transmitted. In other words, in NR, a BS or UE may determine, via the PDCCH, whether retransmission of UL data is required and whether to perform new transmission. This is because asynchronous HARQ is used in NR. UL HARQ ACK/NACK information for DL data transmission may be transmitted through a physical UL control channel (PUCCH) or a physical UL shared channel (PUSCH). In general, a PUCCH is transmitted in the UL of a primary cell (PCell), as described later, but a BS may additionally transmit the PUCCH to the UE on a secondary cell (S Cell) when it is supported by a UE, as described later, and the SCell is referred to as a PUCCH SCell.

Although not shown in FIG. 1B, a radio resource control (RRC) layer may exist as a higher layer of the PDCP layer at each of the UE and the BS, and exchange connection and measurement configuration control messages for controlling radio resources. For example, the BS may indicate measurement to the UE by using a message from the RRC layer, and the UE may report a result of the measurement to the BS by using a message from the RRC layer.

Moreover, the PHY layer may be configured to use one or more frequencies/carriers, and a technology for simultaneously configuring and using a plurality of frequencies is referred to as carrier aggregation (CA). A CA technology may significantly increase a transmission capacity by the number of secondary carriers by using a primary carrier and one or a plurality of secondary carriers instead of only one carrier for communication between a UE and a BS (e.g., an eNB in LTE or a gNB in NR). In LTE, a cell in a BS using a primary carrier is termed a PCell, and a cell using a secondary carrier is termed a SCell. A technology that extends CA functionality to two BSs is referred to as dual connectivity (DC). In the DC technology, a UE may be simultaneously connected to and use a master BS (a Master Evolved Universal Terrestrial Radio Access Network (E-UTRAN) NodeB (MeNB)) and a secondary BS (a secondary E-UTRAN nodeB (SeNB)), and cells belonging to the master BS are referred to as a MCG, and cells belonging to the secondary BS are referred to as a SCG. There is a representative cell for each cell group, and a representative cell of the MCG is referred to as a PCell, and a representative cell of the SCG is referred to as a primary secondary cell (PSCell). When using the above-described NR, the MCG may use an LTE technology while the SCG may use the NR, so that a UE may use the LTE and NR simultaneously. In NR, each cell group (i.e., MCG or SCG) may have a maximum of 16 serving cells (a PCell and SCells in a MCG or a PSCell and SCells in a SCG).

FIG. 1C is a flowchart of a process of providing a multimedia broadcast multicast service (MBMS) in LTE and NR systems, according to an embodiment of the present disclosure.

An MBMS is a technology that provides a broadcasting service to UEs in an RRC IDLE mode or an RRC CONNECTED mode. An MBMS service area is a network area consisting of multiple BSs capable of performing MBMS single frequency network (MBSFN) transmission. An MBSFN area is a network area consisting of several cells integrated for MBSFN transmission, and all cells within the MBSFN area are synchronized for performing MBSFN transmission. Except for MBSFN area reserved cells, all cells are used for MBSFN transmission. An MBSFN area reserved cell is a cell not used for MBSFN transmission, and the cell may transmit data for other purposes but is allowed to use limited transmission power on radio resources allocated for MBSFN transmission.

In operation 1c-15, a UE 1c-05 receives system information block type 1 (SIB1) from a BS 1c-10. The SIB1 includes scheduling information for other SIBs. Therefore, the UE needs to receive SIB1 in advance in order to receive the other SIBs. In operation 1c-20, the UE 1c-05 receives SIB type 2 (SIB2) from the BS 1c-10. An MBSFN subframe configuration list (MBSFN-SubframeConfigList information element (IE)) in the SIB2 indicates subframes that can be used for MBSFN transmission. An MBSFN-SubframeConfigList IE includes MBSFN-SubframeConfig IE and indicates which subframe of a radio frame can be used as an MBSFN subframe. Table 1 below shows a configuration of an MBSFN-SubframeConfig IE.

TABLE 1

| MBSFN-SubframeConfig information element |
| --- |
| -- ASN1START |
| MBSFN-SubframeConfig ::=   SEQUENCE { |
|    radioframeAllocationPeriod   ENUMERATED {n1, n2, n4, n8, n16, n32}, |
|    radioframeAllocationOffset   INTEGER (0..7), |
|    subframeAllocation   CHOICE { |
|      oneFrame   BIT STRING (SIZE(6)), |
|      fourFrames   BIT STRING (SIZE(24)) |
|    } |
| } |
| -- ASN1STOP |

Here, a radio frame allocation period (radioFrameAllocationPeriod) and a radio frame allocation offset(radioFrameAllocationOffset) are used to indicate a radio frame having an MBSFN subframe, and a radio frame that satisfies an equation SFN mod radioFrameAllocationPeriod=radioFrameAllocationOffset has an MBSFN subframe.

A SFN is a system frame number and indicates a radio frame number. The SFN repeats in a range of 0 to 1023. Subframe allocation (subframeAllocation) indicates which subframe is an MBSFN subframe in a radio frame indicated by the equation. The subframe allocation (subframeAllocation) indicates an MBSFN subframe in units of one radio frame or four radio frames. When the unit of one radio frame is used, an MBSFN subframe is indicated in oneframe IE. An MBSFN subframe may be any of subframes #1, #2, #3, #6, #7, and #8 among a total of 10 subframes within a radio frame. Thus, a oneFrame IE indicates an MBSFN subframe among the enumerated subframes by using 6 bits. When the unit of four radio frames is used, an MBSFN subframe is indicated in fourFrames IE. A total of 24 bits are used to cover the four radio frames, and MBSFN subframes are indicated among the enumerated subframes within each of the four radio frames. Therefore, the UE 1c-05 may accurately identify which subframe can be an MBSFN subframe by using the MBSFN-SubframeConfigList IE.

If the UE 1c-05 desires MBSFN reception, the UE 1c-05 receives SIB type13 (SIB13) from the BS 1c-10 in operation 1c-25. An MBSFN area information list (MBSFN-AreaInfoList IE) in the SIB13 includes information about a location where a multicast control channel (MCCH) is transmitted per MBSFN area provided by cells, and the UE 1c-05 may receive the MCCH by using the information in operation 1c-30.

Table 2 below shows an MBSFN-AreaInfoList IE. There is a corresponding MCCH per MBSFN area, and the MBSFN-AreaInfoList IE includes MCCH scheduling information for all MBSFN areas. The MBSFN-AreaInfo IE includes MCCH scheduling information and other information. Mbsfn-AreaId is an MBSFN area ID. non-MBSFNregionLength indicates the number of symbols corresponding to a non-MBSFN region among symbols in an MBFSN subframe. The symbols are located in a front part of the subframe. notificationIndicator is used to indicate a PDCCH bit that notifies the UE about a change in MCCH information. MCCH-Config IE contains MCCH scheduling information. MCCH-RepetitionPeriod and MCCH-Offset are used to indicate a location of a radio frame including the MCCH. mcch-ModificationPeriod is a transmission period of the MCCH, and sf-AllocInfo indicates a location of a subframe including the MCCH in the radio frame including the MCCH. signalingMCS indicates a modulation and coding scheme (MCS) applied to a subframe indicated by the sf-AllocInfo and a (physical) multicast channel ((P)MCH).

TABLE 2

MBSFN-AreaInfoList information element

```
-- ASN1START
MBSFN-AreaInfoList-r9 ::=      SEQUENCE
                               (SIZE(1..maxMBSFN-Area)) OF
                               MBSFN-AreaInfo-r9
MBSFN-AreaInfo-r9 ::=          SEQUENCE {
   mbsfn-AreaId-r9                INTEGER (0..255),
   non-MBSFNregionLength          ENUMERATED {s1, s2},
   notificationIndicator-r9       INTEGER (0..7),
   mcch-Config-r9                 SEQUENCE {
      mcch-RepetitionPeriod-r9       ENUMERATED {rf32, rf64,
                                     rf128, rf256},
      mcch-Offset-r9                 INTEGER (0..10),
      mcch-ModificationPeriod-r9     ENUMERATED {rf512,
                                     rf1024},
      sf-AllocInfo-r9                BIT STRING (SIZE(6)),
      signallingMCS-r9               ENUMERATED {n2, n7, n13,
                                     n19}
   },
   ...
}
```

MBSFN area configuration (MBSFNAreaConfiguration IE) via MCCH indicates a location of a resource used for MBSFN transmission, and the UE 1c-05 receives an MBSFN subframe by using the information in operation 1c-35. commonSF-Alloc indicates subframes allocated to an MBSFN area. commonSF-AllocPeriod is a period during which the subframes indicated by the commonSF-Alloc repeat. A Pmch-InfoList IE includes configuration information of all PMCHs of an MBSFN area.

TABLE 3

MBSFNAreaConfiguration message

```
-- ASN1START
MBSFNAreaConfiguration-r9 ::=      SEQUENCE {
   commonSF-Alloc-r9                  CommonSF-AllocPatternList-r9,
   commonSF-AllocPeriod-r9            ENUMERATED {
                                      rf4, rf8, rf16, rf32, rf64, rf128, rf256},
   pmch-InfoList-r9                   PMCH-InfoList-r9,
   nonCriticalExtension               MBSFNAreaConfiguration-v930-IEs      OPTIONAL
}
MBSFNAreaConfiguration-v930-IEs ::= SEQUENCE {
   lateNonCriticalExtension           OCTET STRING                          OPTIONAL,  --
Need OP
   nonCriticalExtension               SEQUENCE { }                          OPTIONAL   --
Need OP
}
CommonSF-AllocPatternList-r9 ::=   SEQUENCE (SIZE (1..maxMBSFN-Allocations)) OF MBSFN-
SubframeConfig
-- ASN1STOP
```

In operation 1c-40, the UE 1c-05 obtains the location of an MBSFN subframe in which a desired multicast traffic channel (MTCH) is transmitted from a MCH scheduling information MAC control element (CE) (which is one among MAC CEs of the received MAC PDU). The UE 1c-05 decodes the desired MTCH by using MCH scheduling information in operations 1c-45.

Figure 1D:
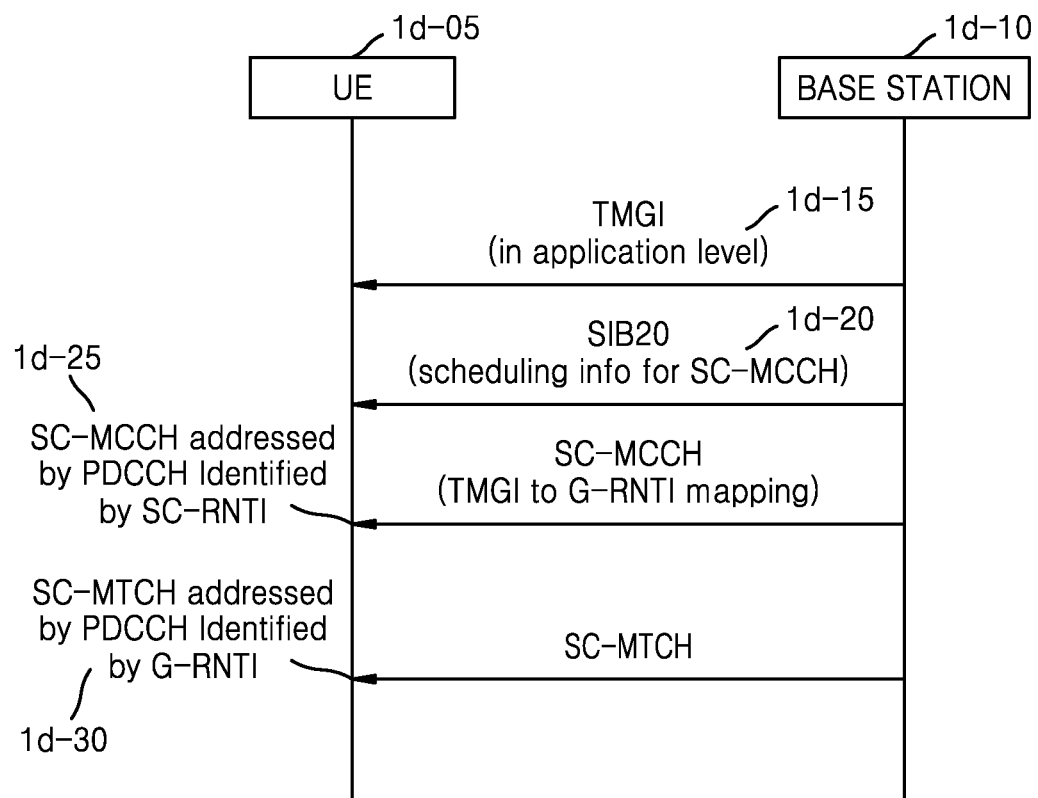
FIG. 1D is a flowchart of a process of providing a single-cell point-to-multipoint (SC-PTM) service in LTE and NR systems, according to an embodiment of the present disclosure.

FIG. 1D is a flowchart of a process of providing a single-cell point-to-multipoint (SC-PTM) service in LTE and NR systems, according to an embodiment of the present disclosure.

The above-described MBMS aims to provide broadcasting services to a plurality of users in an MBSFN area consisting of several cells. The broadcasting services are provided to a plurality of users by using MBSFN subframes allocated statically or semi-statically in a cell. MBMS has the capability to provide the same content to a plurality of users. Apart from this, the Rel-13 LTE standard introduced a SC-PTM technique. The SC-PTM technique supports group calls for commercial or disaster relief purposes in a limited area, e.g., in a service area of a single cell. In addition, the SC-PTM may be able to support a group call within one cell even in a situation where there is no connection to an external backhaul network. It is very efficient to apply this technique to a group call in which data to be transmitted or received is irregularly generated by providing scheduling information to a plurality of UEs that participate in the group call.

A BS 1*d*-10 provides temporary mobile group identity (TMGI) information to a UE 1*d*-05 (1*d*-15). The TMGI consists of a public land mobile network (PLMN) ID and a service ID, and indicates an MBMS service ID.

The UE 1*d*-05 may have a TMGI of interest. For example, a police officer may have a TMGI for security purposes. If the UE 1*d*-05 desires to perform a group call related to the TGMI, the UE 1*d*-05 receives SIB type 20 (SIB20) broadcast by the BS 1*d*-10 (1*d*-20). The SIB20 includes scheduling information and single cell radio network temporary identifier (SC-RNTI) information required to receive a SC-MCCH that is a control channel. The UE 1*d*-05 receives, from the BS 1*d*-10, a SC-MCCH indicated by the SC-RNTI on a PDCCH indicated by the obtained scheduling information (1*d*-25). The SC-MCCH carries TMGI-to-group RNTI (G-RNTI) mapping information. The UE 1*d*-05 receives, from the BS 1*d*-10, a SC-MTCH indicated by a G-RNTI corresponding to the TMGI of interest (1*d*-30).

Figure 1E:
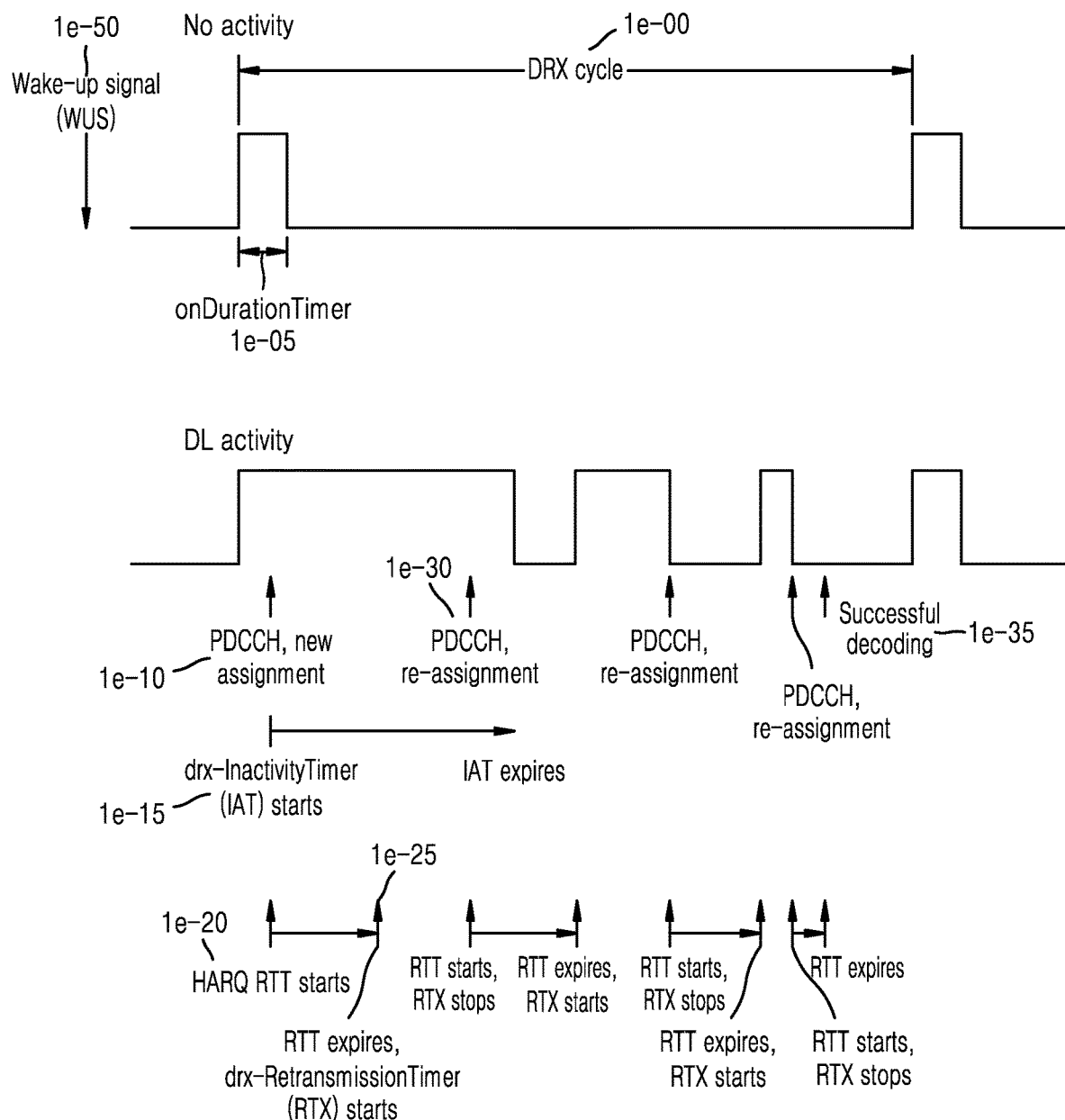
FIG. 1E is a diagram for explaining a discontinuous reception operation configured for a UE in order to reduce power consumption of the UE, according to an embodiment of the present disclosure.

FIG. 1E is a diagram for explaining a discontinuous reception (hereinafter referred to as DRX) operation configured for a UE in order to reduce power consumption of the UE, according to an embodiment of the present disclosure.

DRX is a technology that allows a UE to monitor only some PDCCHs according to configuration information from a BS instead of monitoring every PDCCH in order to obtain scheduling information based on configuration by the BS, thereby minimizing power consumption of the UE. A time period during which the UE monitors some PDCCHs in this way is referred to as an active time. Active time includes the following time:
- while drx-onDurationTimer or drx-InactivityTimer or drx-RetransmissionTimerDL or drx-RetransmissionTimerUL or ra-ContentionResolutionTimer is running; or
- while a scheduling request for requesting UL resources has not yet been cancelled but is pending; or
- while the UE has not received a PDCCH for new data transmission from the BS after performing a non-contention-based random access (RA) and then receiving a RA response (RAR).

A basic DRX operation has a DRX cycle 1*e*-00, and the PDCCH is monitored only during onDuration 1*e*-05. For the DRX cycle in a connected mode, values of both a long DRX cycle and a short DRX cycle are configured. In a general case, a long DRX cycle is applied, and if necessary, the BS may additionally configure a short DRX cycle. When both the long DRX cycle and the short DRX cycle are configured, the UE starts a drxShortCycleTimer and simultaneously repeats from the short DRX cycle, and when there is no new traffic after the drxShortCycleTimer expires, the UE switches the DRX cycle from the short DRX cycle to the long DRX cycle. If scheduling information for a new packet is received via the PDCCH during the onDuration 1*e*-05 (1*e*-10), the UE starts InactivityTimer (1*e*-15). The UE stays in an active state for a duration of the InactivityTimer. In other words, the UE continues monitoring the PDCCH. Also, the HARQ RTT timer is started (1*e*-20). The HARQ RTT timer is applied to prevent the UE from unnecessarily monitoring the PDCCH during HARQ round trip time (RTT), and the UE does not need to perform PDCCH monitoring while the HARQ RTT timer is running. However, while the InactivityTimer and the HARQ RTT timer are running simultaneously, the UE continues monitoring the PDCCH based on the InactivityTimer. When the HARQ RTT timer expires, a DRX retransmission timer is started (1*e*-25). While the DRX retransmission timer is running, the UE is required to perform PDCCH monitoring. In general, for a duration of the DRX retransmission timer, scheduling information for HARQ retransmission is received (1*e*-30). Upon receiving the scheduling information, the UE immediately stops the DRX retransmission timer and restarts the HARQ RTT timer. The above operation continues until the packet is successfully received (1*e*-35). Furthermore, if the BS no longer has data to transmit to the UE while the onDurationTimer or the inactivityTimer is running, the BS may additionally transmit a DRX command MAC CE to the UE. Upon receiving this, the UE stops both the running onDurationTimer and inactivityTimer, and if a short DRX cycle is configured, the UE uses the short DRX cycle first or if only a long DRX cycle is configured, it uses the long DRX cycle.

Moreover, in the above DRX technology, the UE should always wake up for a duration of the onDurationTimer that repeats every cycle, and in order to further reduce power consumption, the BS may separately indicates to the UE whether it should wake up for a duration of the onDurationTimer of each cycle to attempt data reception. This is referred to as a wake-up signal (WUS) 1*e*-50. The WUS may be a physical signal specially designed to reduce power consumption, or may refer to a PDCCH. In a case that a PDCCH is used, the UE may wake up at the time when the WUS is transmitted to receive the PDCCH by using a power saving RNTI (PS-RNTI) for scrambling of a PDCCH carrying WUS information, and if there is the WUS information therein, the UE may wake up for a subsequent duration of the onDurationTimer to receive data, whereas if there is no corresponding information (or if the UE receives an indication not to wake up), the UE may not wake up for the subsequent duration of onDurationTimer to further reduce the power consumption.

Figure 1F:
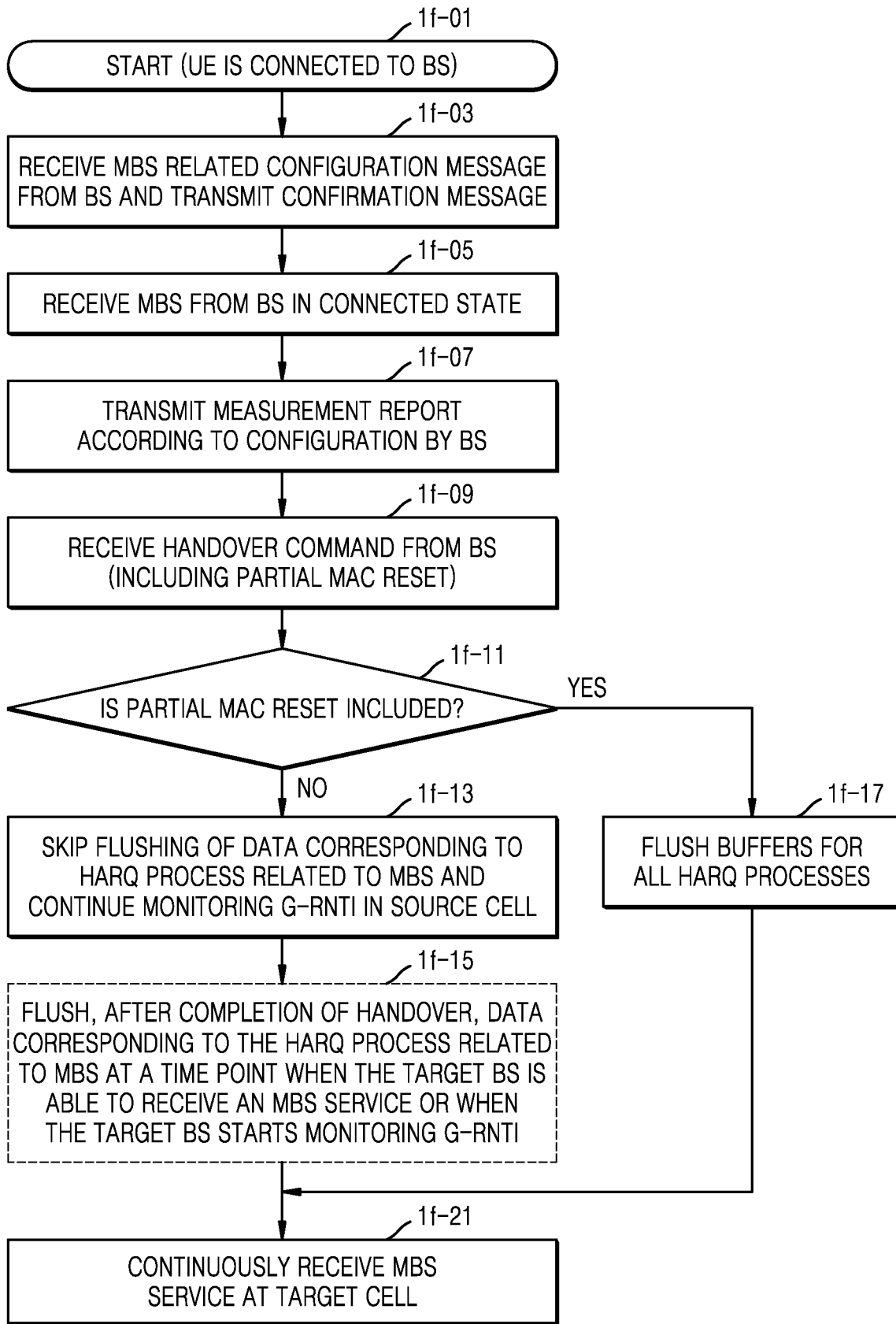
FIG. 1F is a diagram for explaining an operation in which a UE in a connected state receives a multicast broadcast service (MBS) according to an embodiment of the present disclosure.

FIG. 1F is a diagram for explaining an operation in which a UE in a connected state receives a multicast broadcast service (MBS) in a connected state according to an embodiment of the present disclosure.

In FIG. 1*f*, it is assumed that a UE is connected to a BS and is in an RRC CONNECTED mode (operation 1*f*-01). Thereafter, the UE receives various configurations including an MBS, and transmits a confirmation message for the configurations to the BS (operation 1*f*-03). The configuration information transmitted by the BS may be received using an RRCReconfiguration message from the RRC layer, and the confirmation message transmitted by the UE may be transmitted using an RRCReconfigurationComplete message from the RRC layer.

The RRCReconfiguration message may include configuration information for a bearer that is a logical path over which a control message and data are transmitted. For example, the RRCReconfiguration message may include configuration information for a signaling radio bearer 2 (SRB2) for transmitting a control message between the UE and a CN, a data radio bearer (DRB) for transmitting unicast data of the UE, and a DRB for an MBS service (or for PTM). The configuration information for the MBS service may include an identifier (G-RNTI) within a cell for receiving the MBS service. Furthermore, configuration information indicating neighboring cell measurement and reporting for handover, etc. may be included in the RRCReconfiguration message. In addition, the above-described DRX related configurations and details of timers corresponding thereto may be configured for the UE, and PS-RNTI related configuration may also be included in the RRCReconfiguration message. In addition, configuration information related to an HARQ process that the UE can use in a current cell may be included in the RRCReconfiguration message.

The HARQ process is a unit for identifying an HARQ operation to allow parallel transmissions when the BS transmits data to the UE in DL. For example, if the BS indicates HARQ process number 1 and transmits data to the UE using the HARQ process number 1 and subsequently indicates HARQ process number 3 and transmits data to the same UE using the HARQ process number 3, even when reception of the data transmitted based on the HARQ process number 1 is not completed, the UE may not discard the data received based on the HARQ process number 1 but perform reception in HARQ process number 1 and HARQ process number 3 by using independent buffers. In an NR system, for DL, a maximum of 16 HARQ processes are supported. Accordingly, the BS may configure the UE with the number of HARQ processes (nrofHARQ-Processes-ForPDSCH) (e.g., n) used for DL unicast data transmission. In addition, the number of HARQ processes (e.g., m) for MBS may be separately configured. This parameter may be configured for a serving cell where G-RNTI monitoring is configured, and an HARQ process for unicast operates independently of an HARQ process for MBS and HARQ process identifiers therefor are also independent of each other. For example, process x for unicast and process x for MBS mean different HARQ processes in which soft combining is performed independently and HARQ feedback is independently controlled. An HARQ process for MBS is mapped to only one G-RNTI, and one G-RNTI is mapped to at least one HARQ process for MBS. Thus, the UE may determine that data received using the G-RNTI is MBS data and that data received using the C-RNTI is unicast data.

Furthermore, although not shown in this figure, configuration information related to the MBS service may be transmitted in a SIB that the BS broadcasts to UEs in the cell. In this case, all UEs receiving the MBS use the corresponding information as the same information. As an example of such an operation, a scenario in which the same service is managed and transmitted based on the same HARQ process for several cells (i.e., for a set of cells) may be considered.

The UE that has received the configuration information related to the MBS receives MBS data from the BS according to the configuration information (1f-05). In other words, the UE monitors a G-RNTI and a cell RNTI (C-RNTI) in PDCCH monitoring resources configured for the UE, and for MBS, the UE receives data according to information of a PDCCH scrambled by the G-RNTI. Moreover, because it is assumed in this figure that the UE is configured with DRX, the UE monitors the C-RNTI in a search space configured for C-RNTI monitoring during the active time defined in DRX. Furthermore, the UE monitors the PS-RNTI when the UE is in the non-active time among search spaces configured by the BS for PS-RNTI monitoring. In addition, the UE receives the G-RNTI in a search space specified by a particular SearchSpace (a SearchSpace associated with the G-RNTI) among search spaces within a currently operating bandwidth part (BWP) during the active time and the non-active time.

In more detail, if the UE receives DCI addressed to PS-RNTI (i.e., WUS=YES), the UE starts an onDurationTimer according to the above-described DRX operation and monitors the C-RNTI during a corresponding duration to perform an additional DRX operation. However, if the UE does not receive the DCI addressed to the PS-RNTI (or is instructed not to wake up; i.e., WUS=NO) during the non-active time, the UE does not start the onDurationTimer according to the above-described DRX operation and accordingly skip monitoring of the C-RNTI. However, even in this case, the UE needs to perform monitoring for data transmitted using the PS-RNTI. In other words, the DCI addressed to the PS-RNTI only affects C-RNTI monitoring but does not affect G-RNTI monitoring.

According to the above procedure, based on predefined times and rules, the UE receives data (or transport block (TB)) addressed to the G-RNTI and data addressed to the C-RNT. In addition, there may be cases where the UE receives data addressed to a SI-RNTI in order to receive a SIB in which the BS broadcasts configuration information in a cell and where the UE receives data addressed to a temporary cell-RNTI that it can temporarily receive during a RA procedure.

If the UE receives data (or TB) via a PDCCH addressed to a G-RNTI, the UE may soft-combine the received data (TB) with a TB stored for an HARQ process having the same process ID as for the received data (TB) among HARQ processes for MBS mapped to the G-RNTI (in case of retransmission), or overwrite the TB stored for the HARQ process having the corresponding process ID with the received data (in case of new transmission). If a cyclic redundancy check (CRC) error occurs in the received data (TB), the UE may inform the BS of transmission failure by transmitting an HARQ NACK to the BS. On the other hand, if the CRC error does not occur (i.e., if the data is successfully received), the UE does not transmit HARQ feedback to the BS. This is to prevent unnecessary simultaneous transmission of an ACK because there may be multiple UEs receiving the corresponding data in the cell. Alternatively, the BS may configure the UE not to transmit HARQ feedback even when the HARQ feedback is a NACK. This configuration may be used when the BS performs retransmission a fixed number of times (corresponding to an integer of 0 or greater than or equal to 1).

If the UE receives data (or TB) via a PDCCH addressed to a C-RNTI, the UE may soft-combine the received data (TB) with a TB stored for an HARQ process having the same process ID as for the received data (TB) among HARQ processes for unicast mapped to the C-RNTI (in case of retransmission), or overwrite the TB stored for the HARQ process having the corresponding process ID with the received data (in case of new transmission). Whether retransmission or new transmission occurs may be determined based on a new data indicator (NDI) identifier included in the PDCCH. In this case, if a CRC error occurs in the received data (TB), the UE informs the BS of transmission failure by transmitting an HARQ NACK to the BS, and if a CRC error does not occur (that is, if the data is successfully received), the UE informs the BS that the transmission is successful by transmitting an HARQ ACK to the BS.

If the UE receives data via a PDCCH addressed to a temporary C-RNTI, the UE performs soft-combining of thew received data with a TB stored for a predefined HARQ process for unicast (i.e., HARQ process ID 0). When the reception is not successful, the UE does not transmit an HARQ NACK in order to avoid collision because another UE may transmit feedback to the BS. However, in case of successful reception (i.e., when the corresponding DL data is transmitted to the UE itself), the UE informs the BS that the transmission is successful by transmitting a HARQ ACK to the BS.

If the UE receives data via a PDCCH addressed to a SI-RNTI, the UE may soft-combine the received data with a TB stored in a separate buffer (a SI HARQ process) for receiving SI, or overwrite the stored TB with the received data. In addition, the UE does not transmit HARQ feedback to the BS regardless of whether reception is successful.

The UE may report measurement information regarding neighboring cells to the BS according to information configured via the RRCReconfiguration message while simultaneously receiving data according to the above procedure. The reporting may be performed periodically or under a specific condition (e.g., when a signal strength of a current cell deteriorates, etc.), and the condition may be configured by the BS. Accordingly, if a current BS (a source BS) decides to hand over a UE to another BS, for handover, the BS (the source BS) transmits a Handover Request message to a BS (a target BS) to which the UE is to perform handover. In this case, the source BS may include a list of MBS services being received by the UE in the Handover Request message. After receiving the Handover Request message, the target BS transmits, to the source BS, DRB configuration information related to MBS and configuration information for a corresponding bearer of an RLC layer, DRB configuration information for unicast and configuration information for a corresponding bearer of the RLC layer when the UE is handed over to the target BS, and the source BS may transmit such information to the UE (1*f*-09). Although the information is expressed as a handover command in FIG. 1F, an IE (a field unit within a message) referred to as reconfigurationWithSync is included in the RRCReconfiguration message, so that the UE performs handover to the target BS indicated in the reconfigurationWithSync. In addition, the RRCReconfiguration message may include an indicator indicating partial reset of a MAC layer to the UE.

If the RRCReconfiguration message includes an indicator indicating a partial MAC reset (1*f*-11), the UE flushes the remaining HARQ processes other than an HARQ process for MBS (i.e., a general HARQ process, a SI HARQ process, etc.) among HARQ processes configured for a serving cell while skipping flushing of the HARQ process for MBS, or flushes the HARQ process for MBS after handover is completed. In other words, in the case of the flushing operation, after the handover is completed, the UE may flush data corresponding to the HARQ process related to MBS at a time point when the UE is able to receive an MBS service from the target BS or when the UE starts G-RNTI monitoring(1*f*-15). Also, until the handover is completed, the UE may continuously receive data from the source BS through the G-RNTI and perform monitoring of a C-RNTI assigned via the RRCReconfiguration message in the target BS(1*f*-13). Alternatively, the UE may continuously receive data from the target BS via the G-RNTI even before a RA procedure is completed.

However, if the RRCReconfiguration message does not include the indicator indicating the partial MAC reset (1*f*-11), the UE performs the entire MAC reset operation and accordingly flushes all of the general HARQ process, the HARQ process for MBS, and the SI HARQ process (1*f*-17).

Thereafter, the UE may continuously receive the MBS service from the target BS (1*f*-21). According to the above procedure, the UE may continuously receive data without flushing a buffer even during the handover.

Figure 1G:
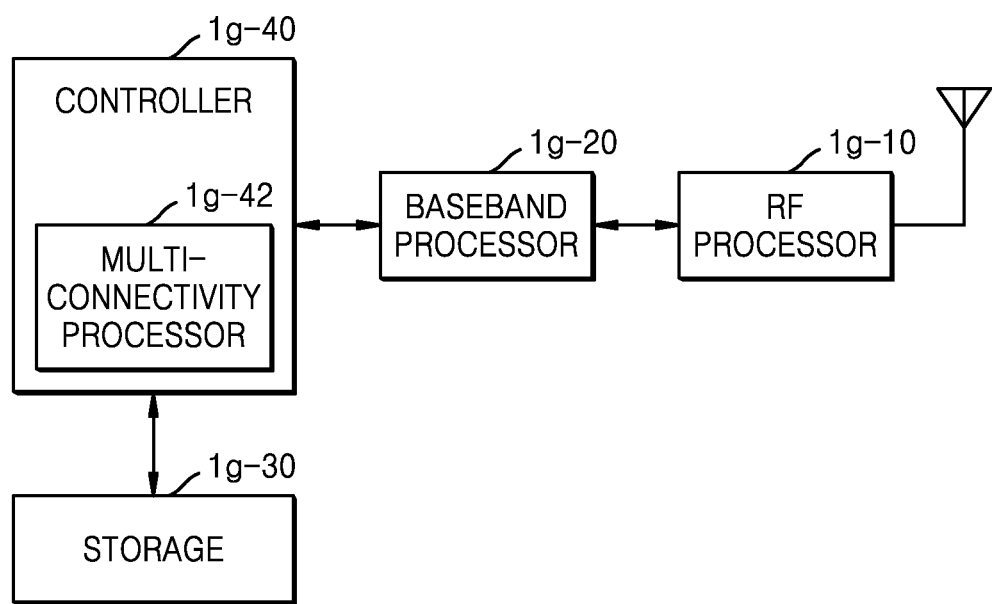
FIG. 1G is an exemplary block diagram of a configuration of a UE according to an embodiment of the present disclosure.

FIG. 1G is an exemplary block diagram of a configuration of a UE according to an embodiment of the present disclosure.

Referring to FIG. 1G, the UE may include a radio frequency (RF) processor 1*g*-10, a baseband processor 1*g*-20, a storage 1*g*-30, and a controller 1*g*-40. However, the UE is not limited to the above example but may include fewer or more components than those illustrated in FIG. 1G.

The RF processor 1*g*-10 may perform a function for transmitting and receiving signals via a radio channel, such as signal conversion between bands and amplification. In detail, the RF processor 1*g*-10 may up-convert a baseband signal from the baseband processor 1*g*-20 into an RF signal and then transmit the RF signal via an antenna, and down-convert an RF signal received via the antenna into a baseband signal. For example, the RF processor 1*g*-10 may include a transmit filter, a receive filter, an amplifier, a mixer, an oscillator, a digital to analog convertor (DAC), an analog to digital convertor (ADC), etc. Although only one antenna is shown in FIG. 1G, the UE may include a plurality of antennas. The RF processor 1*g*-10 may also include a plurality of RF chains. Furthermore, the RF processor 1*g*-10 may perform beamforming. For beamforming, the RF processor 1*g*-10 may adjust a phase and a magnitude of each of the signals transmitted and received through a plurality of antennas or antenna elements.

The baseband processor 1*g*-20 may perform a function for conversion between a baseband signal and a bit string according to a physical layer standard of a system. For example, when transmitting data, the baseband processor 1*g*-20 may generate complex symbols by encoding and modulating a transmission bit string. Furthermore, when receiving data, the baseband processor 1*g*-20 may reconstruct a reception bit string by demodulating and decoding a baseband signal from the RF processor 1*g*-10. For example, according to an OFDM scheme, when transmitting data, the baseband processor 1*g*-20 may generate complex symbols by encoding and modulating a transmission bit string, map the complex symbols to subcarriers, and then generate OFDM symbols through inverse fast Fourier transform (IFFT) operations and cyclic prefix (CP) insertion. Furthermore, when receiving data, the baseband processor 1*g*-20 may divide the baseband signal from the RF processor 1*g*-10 into OFDM symbols, recover signals mapped to subcarriers through FFT operations, and then reconstruct a reception bit string through demodulation and decoding.

The baseband processor 1*g*-20 and the RF processor 1*g*-10 may transmit and receive signals as described above. Thus, the baseband processor 1*g*-20 and the RF processor 1*g*-10 may be referred to as a transmitter, receiver, transceiver, or communicator. In addition, at least one of the baseband processor 1*g*-20 and the RF processor 1*g*-10 may include different communication modules to process signals in different frequency bands. Furthermore, the different frequency bands may include super-high frequency (SHF) bands (e.g., 2.5 GHz and 5 GHz) and millimeter (mm)-wave bands (e.g., 60 GHz). The UE may transmit and receive signals to and from a BS via the baseband processor 1g-20 and the RF processor 1g-10, and the signals may include control information and data.

The storage 1g-30 may store basic programs, application programs, and data such as configuration information for operations of the UE. The storage 1g-30 may be composed of storage media, such as read-only memory (ROM), random access memory (RAM), hard discs, compact disc (CD)-ROM, and digital versatile discs (DVDs), or a combination thereof. Furthermore, the storage 1g-30 may include a plurality of memories. According to an embodiment of the present disclosure, the storage 1g-30 may store a program for a method, performed by the UE according to the present disclosure, of applying HARQ to an MBS.

The controller 1g-40 may control all operations of the UE. For example, the controller 1g-40 may transmit or receive signals via the baseband processor 1g-20 and the RF processor 1g-10. The controller 1g-40 may also write and read data to and from the storage 1g-40. To do so, the controller 1g-40 may include at least one processor. For example, the controller 1g-40 may include a communication processor (CP) for performing control for communication and an application processor (AP) for controlling higher layers such as application programs. In addition, at least one component in the UE may be implemented as a single chip. Furthermore, according to an embodiment of the present disclosure, the controller 1g-40 may include a multi-connectivity processor 1g-42 that performs processing for operating in a multi-connectivity mode. For example, the controller 1g-40 may control the UE to perform the procedure according to the operation of the UE illustrated in FIG. 1F.

According to an embodiment of the present disclosure, when receiving an MBS from a BS, the UE may transmit feedback if reception fails, and receive the MBS without data loss even during handover.

Figure 1H:
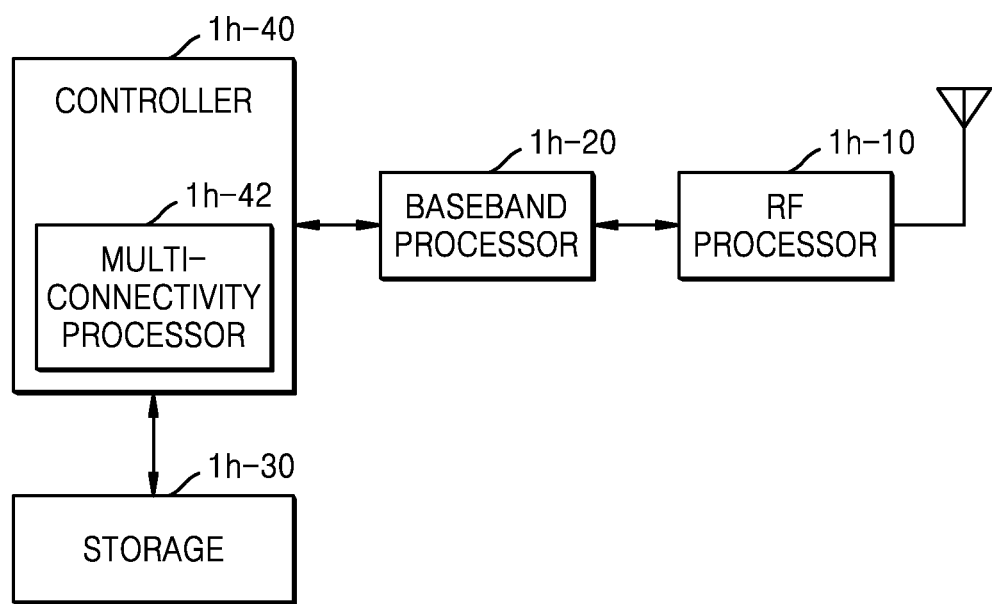
FIG. 1H is an exemplary block diagram of a configuration of a base station according to an embodiment of the present disclosure.

FIG. 1H is an exemplary block diagram of a configuration of a BS according to an embodiment of the present disclosure.

Referring to FIG. 1H, the BS may include an RF processor 1h-10, a baseband processor 1h-20, a storage 1h-30, and a controller 1h-40. However, the BS is not limited to the above example but may include fewer or more components than those illustrated in FIG. 1H.

The RF processor 1h-10 may perform a function for transmitting and receiving signals via a radio channel, such as signal conversion between bands and amplification. In detail, the RF processor 1h-10 may up-convert a baseband signal from the baseband processor 1h-20 into an RF signal and then transmit the RF signal via an antenna, and down-convert an RF signal received via the antenna into a baseband signal. For example, the RF processor 1h-10 may include a transmit filter, a receive filter, an amplifier, a mixer, an oscillator, a DAC, an ADC, etc. Although only one antenna is shown in FIG. 1H, the BS may include a plurality of antennas. Furthermore, the RF processor 1h-10 may include a plurality of RF chains. Furthermore, the RF processor 1h-10 may perform beamforming. For beamforming, the RF processor 1h-10 may adjust a phase and magnitude of each of the signals transmitted and received through a plurality of antennas or antenna elements.

The baseband processor 1h-20 may perform a function for conversion between a baseband signal and a bit string according to a physical layer standard. For example, when transmitting data, the baseband processor 1h-20 may generate complex symbols by encoding and modulating a transmission bit string. Furthermore, when receiving data, the baseband processor 1h-20 may reconstruct a reception bit string by demodulating and decoding a baseband signal from the RF processor 1h-10. For example, according to an OFDM scheme, when transmitting data, the baseband processor 1h-20 may generate complex symbols by encoding and modulating a transmission bit string, map the complex symbols to subcarriers, and then generate OFDM symbols through IFFT operations and CP insertion. Furthermore, when receiving data, the baseband processor 1h-20 may divide the baseband signal from the RF processor 1h-10 into OFDM symbols, recover signals mapped to subcarriers through FFT operations, and then reconstruct a reception bit string through demodulation and decoding.

The baseband processor 1h-20 and the RF processor 1h-10 may transmit and receive signals as described above. Thus, the baseband processor 1h-20 and the RF processor 1h-10 may be referred to as a transmitter, receiver, transceiver, communicator, or wireless communicator. In addition, at least one of the baseband processor 1h-20 and the RF processor 1h-10 may include different communication modules to process signals in different frequency bands. Furthermore, the different frequency bands may include SHF bands (e.g., 2.5 GHz and 5 GHz) and mmWave bands (e.g., 60 GHz). The BS may transmit and receive signals to and from the UE via the baseband processor 1h-20 and the RF processor 1h-10, and the signals may include control information and data.

The storage 1h-30 stores basic programs, application programs, and data such as configuration information for operations of the BS. The storage 1h-30 may be composed of storage media, such as ROM, RAM, hard discs, CD-ROM, and DVDs, or a combination thereof. Furthermore, the storage 1h-30 may include a plurality of memories. According to an embodiment of the present disclosure, the storage 1h-30 may store a program for a method, performed by the BS according to the present disclosure, of applying HARQ to an MBS.

The controller 1h-40 may control all operations of the BS. For example, the controller 1h-40 may transmit or receive signals through the baseband processor 1h-20 and the RF processor 1h-10. The controller 1h-40 may also write and read data to and from the storage 1h-40. To do so, the controller 1h-40 may include at least one processor. For example, the controller 1h-40 may include a CP for performing control for communication and an AP for controlling higher layers such as application programs. In addition, at least one component in the BS may be implemented as a single chip. Furthermore, according to an embodiment of the present disclosure, the controller 1h-40 may include a multi-connectivity processor 1h-42 that performs processing for operating in a multi-connectivity mode. For example, the controller 1h-40 may control the BS to perform a procedure according to an operation of the BS corresponding to the operation of the UE illustrated in FIG. 1F.

Methods according to embodiments of the present disclosure described in the appended claims or specification thereof may be implemented in hardware, software, or a combination of hardware and software.

When the methods are implemented in software, a computer-readable storage medium having at least one program (software module) stored therein may be provided. The at least one program stored in the computer-readable storage medium is configured for execution by at least one processor within an electronic device. The at least one program includes instructions that cause the electronic device to execute the methods according to the embodiments of the present disclosure described in the claims or specification thereof.

The program (software module or software) may be stored in RAM, non-volatile memory including a flash memory, ROM, electrically erasable programmable ROM (EEPROM), magnetic disc storage devices, CD-ROM, DVDs or other types of optical storage devices, and magnetic cassettes. Alternatively, the program may be stored in a memory that is configured as a combination of some or all of the stated devices. A plurality of such memories may be included.

Furthermore, the program may be stored in an attachable storage device that may be accessed through communication networks such as the Internet, Intranet, a local area network (LAN), a wide LAN (WLAN), and a storage area network (SAN) or a communication network configured in a combination thereof. Such a storage device may connect to a device for performing the methods according to the embodiments of the present disclosure via an external port. In addition, a separate storage device on the communication network may also connect to a device for performing the methods according to the embodiments of the present disclosure.

In the specific embodiments of the present disclosure, a component included in the present disclosure is expressed in a singular or plural form depending on the presented specific embodiments. However, singular or plural expressions are selected to be suitable for the presented situations for convenience of descriptions, and the present disclosure is not limited to elements in a singular or plural form, i.e., an element expressed in a plural form may be configured as a single element, or an element expressed in a singular form may be configured as a plurality of elements.

Moreover, although specific embodiments have been described in the detailed description of the present disclosure, various modifications may be made therein without departing from the scope of the present disclosure. Thus, the scope of the present disclosure should not be limited to the described embodiments but be defined by the following claims as well as their equivalents. In other words, it is obvious to those of ordinary skill in the art that other modifications based on the technical spirit of the present disclosure are implementable. Furthermore, the embodiments may be combined with each other for operation when necessary. For example, parts of the methods presented in the present disclosure may be combined with one another to operate a BS and a UE. Although the embodiments are proposed based on a 5G or NR system, other modifications based on the technical spirit of the embodiments may also be applicable to other systems such as LTE, LTE-A, and LTE-A-Pro systems.

The invention claimed is:

1. A method performed by a user equipment (UE) in a wireless communication system, the method comprising:
   receiving, from a base station (BS), multicast broadcast service (MBS) configuration information including information regarding at least one hybrid automatic repeat request (HARQ) process for an MBS, wherein the at least one HARQ process for the MBS is mapped to a group radio network temporary identifier (G-RNTI);
   receiving, from the BS, a physical downlink control channel (PDCCH) scrambled by the G-RNTI; receiving, from the BS, MBS data based on the PDCCH; and
   processing the MBS data based on an HARQ process having a HARQ process identifier for the MBS data among the at least one HARQ process for the MBS mapped to the G-RNTI.

2. The method of claim 1, wherein the processing of the MBS data comprises, in case that the MBS data is retransmitted data;
   soft-combining the MBS data with data stored for the HARQ process, having the HARQ process identifier for the MBS data among the at least one HARQ process for the MBS mapped to the G-RNTI.

3. The method of claim 1, wherein the processing of the MBS data comprises, in case that the MBS data is not retransmitted data;
   overwriting data stored for the HARQ process, having the HARQ process identifier for the MBS data among the at least one HARQ process for the MBS mapped to the G-RNT, with the MBS data.

4. The method of claim 1, further comprising, in case that a cyclic redundancy check (CRC) error occurs in the MBS data, transmitting HARQ negative-acknowledgement (NACK) information to the BS.

5. The method of claim 1, wherein the MBS configuration information is included in a radio resource control (RRC) message or a system information block (SIB) received from the BS.

6. The method of claim 1, further comprising:
   transmitting, to the BS, measurement information regarding neighboring cells;
   receiving, from the BS, a radio resource control (RRC) message including a handover command; and
   in case that the RRC message includes an indicator indicating partial reset of a medium access control (MAC) layer, receiving new MBS data from the BS until handover to a target BS is completed.

7. A method performed by a base station (BS) in a wireless communication system, the method comprising:
   transmitting, to a user equipment (UE), multicast broadcast service (MBS) configuration information including information about at least one hybrid automatic repeat request (HARQ) process for an MBS, wherein the at least one HARQ process for the MBS is mapped to a group radio network temporary identifier (G-RNTI);
   transmitting, to the UE, a physical downlink control channel (PDCCH) scrambled by the G-RNTI; and
   transmitting, to the UE, MBS data based on the PDCCH, wherein the MBS data is transmitted based on an HARQ process having a HARQ process identifier for the MBS data among the at least one HARQ process for the MBS mapped to the G-RNTI.

8. The method of claim 7, further comprising, in case that a cyclic redundancy check (CRC) error occurs in the MBS data, receiving HARQ negative-acknowledgement (NACK) information from the UE.

9. The method of claim 7, further comprising:
   transmitting, from the UE, measurement information regarding neighboring cells;
   transmitting, to the UE, a radio resource control (RRC) message including a handover command; and
   in case that the RRC message includes an indicator indicating partial reset of a medium access control (MAC) layer, transmitting new MBS data to the UE until handover of the UE to a target BS is completed.

10. A user equipment (UE) in a wireless communication system, the UE comprising:
    a transceiver; and
    at least one processor configured to:

receive, from a base station (BS), multicast broadcast service (MBS) configuration information including information about at least one hybrid automatic repeat request (HARQ) process for an MBS, wherein the at least one HARQ process for the MBS is mapped to a group radio network temporary identifier (G-RNTI);

receive, from the BS, a physical downlink control channel (PDCCH) scrambled by the G-RNTI;

receive, from the BS, an MBS data based on the PDCCH; and process the MBS data based on an HARQ process having a HARQ process identifier for the MBS data among the at least one HARQ process for the MBS mapped to the G-RNTI.

11. A base station (BS) in a wireless communication system, the BS comprising:

a transceiver; and at least one processor configured to:

transmit, to a user equipment (UE), multicast broadcast service (MBS) configuration information including information about at least one hybrid automatic repeat request (HARQ) process for an MBS, wherein the at least one HARQ process for the MBS is mapped to a group radio network temporary identifier (G-RNTI);

transmit, to the UE, a physical downlink control channel (PDCCH) scrambled by the G-RNTI; and transmit, to the UE, MBS data based on the PDCCH, wherein the MBS data is transmitted based on an HARQ process having a HARQ process identifier for the MBS data among the at least one HARQ process for the MBS mapped to the G-RNTI.

* * * * *